(12) United States Patent
Hanlon et al.

(10) Patent No.: US 10,053,757 B2
(45) Date of Patent: Aug. 21, 2018

(54) PROCESS FOR PRODUCING HOT-ROLLED STEEL STRIP

(71) Applicant: TATA STEEL IJMUIDEN BV, IJmuiden (NL)

(72) Inventors: David Neal Hanlon, Hillegom (NL); Theo Arnold Kop, Haarlem (NL); Stefanus Matheus Cornelis Van Bohemen, Leiden (NL)

(73) Assignee: TATA STEEL IJMUIDEN BV, Ijmuiden (NL)

( * ) Notice: Subject to any disclaimer, the term of this patent is extended or adjusted under 35 U.S.C. 154(b) by 432 days.

(21) Appl. No.: 14/415,448

(22) PCT Filed: Jul. 15, 2013

(86) PCT No.: PCT/EP2013/064938
§ 371 (c)(1),
(2) Date: Jan. 16, 2015

(87) PCT Pub. No.: WO2014/019844
PCT Pub. Date: Feb. 6, 2014

(65) Prior Publication Data
US 2015/0191807 A1 Jul. 9, 2015

(30) Foreign Application Priority Data
Aug. 3, 2012 (EP) .................................. 12179148

(51) Int. Cl.
| | | |
|---|---|---|
| *C22C 38/38* | (2006.01) | |
| *C21D 8/04* | (2006.01) | |
| *C22C 38/04* | (2006.01) | |
| *C22C 38/06* | (2006.01) | |
| *B32B 15/01* | (2006.01) | |
| *C22C 38/00* | (2006.01) | |
| *C22C 38/02* | (2006.01) | |
| *C22C 38/28* | (2006.01) | |
| *C22C 38/32* | (2006.01) | |
| *B22D 11/00* | (2006.01) | |
| *C21D 6/00* | (2006.01) | |
| *C21D 8/02* | (2006.01) | |
| *C21D 9/52* | (2006.01) | |

(52) U.S. Cl.
CPC ............ *C22C 38/38* (2013.01); *B22D 11/001* (2013.01); *B32B 15/013* (2013.01); *C21D 6/002* (2013.01); *C21D 6/005* (2013.01); *C21D 6/008* (2013.01); *C21D 8/021* (2013.01); *C21D 8/0215* (2013.01); *C21D 8/0226* (2013.01); *C21D 8/0263* (2013.01); *C21D 8/0426* (2013.01); *C21D 9/52* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C21D 8/0415* (2013.01); *C21D 2211/002* (2013.01); *C21D 2211/005* (2013.01); *C21D 2211/008* (2013.01)

(58) Field of Classification Search
CPC .......... C22C 38/38; C22C 38/32; C22C 38/28
USPC ....................................................... 148/541
See application file for complete search history.

(56) References Cited

U.S. PATENT DOCUMENTS

| | | | |
|---|---|---|---|
| 5,759,297 A | 6/1998 | Teracher et al. | |
| 7,699,947 B2 | 4/2010 | Seux et al. | |
| 2003/0041932 A1* | 3/2003 | Tosaka et al. | 148/602 |
| 2009/0277546 A1 | 11/2009 | Hammer et al. | |

FOREIGN PATENT DOCUMENTS

| | | | |
|---|---|---|---|
| EP | 0747496 A1 | 12/1996 | |
| WO | WO 2012048841 A1 * | 4/2012 | |

OTHER PUBLICATIONS

International Search Report dated Oct. 22, 2013 from International Application PCT/EP2013/064938 to Tata Steel Ijmuiden BV filed Jul. 15, 2013.
Notification of Transmittal of the International Preliminary Report on Patentability dated Nov. 6, 2014 from International Application PCT/EP2013/064938 to Tata Steel Ijmuiden BV filed Jul. 15, 2013.
K. W. Andrews, "Empirical formulae for the calculation of some transformation temperatures," J. Iron Steel Inst., vol. 203, pp. 721-727,1965.
S. M. C. van Bohemen, "Bainite and martensite start temperature calculated with exponential carbon dependence," Mater. Sci. Technol., vol. 28, No. 4, pp. 487-495, Apr. 2012.
W. Steven and A. G. Haynes, "The temperature of formation of martensite and bainite in low-alloy steels," J. Iron Steel Inst., vol. 183, No. 1, pp. 349-359, 1956.

* cited by examiner

*Primary Examiner* — Edward M Johnson
(74) *Attorney, Agent, or Firm* — Vorys, Sater, Seymour and Pease LLP

(57) ABSTRACT

A process for producing hot-rolled steel strip with a tensile strength of between 760 and 940 MPa and a steel produced therewith, suitable for producing parts by working such as press forming, bending or stretch flanging.

14 Claims, 3 Drawing Sheets

PROCESS FOR PRODUCING HOT-ROLLED STEEL STRIP

CROSS-REFERENCE TO RELATED APPLICATIONS

This is a § 371 US National Stage Application of International Application No. PCT/EP2013/064938 filed on Jul. 15, 2013, claiming the priority of European Patent Application No. 12179148.7 filed on Aug. 3, 2012.

The invention relates to a process for producing hot-rolled steel strip with a tensile strength of between 760 and 940 MPa and a steel strip produced therewith, suitable for producing parts by working such as, but not limited to, press forming, bending or stretch flanging.

Enhancement of formability at elevated strength is desirable for widespread markets. In the automotive industry in particular, where legislation is driving improvements in fuel economy and safety, there is a move towards stronger, formable high strength steels. High strength and ultrahigh strength strip steel provides automotive manufacturers potential for down weighting vehicle structures and the opportunity for countering weight increases arising from the move to electric and hybrid vehicles. In addition high and ultrahigh strength steels play a critical role in determining the performance and crash worthiness of modern passenger vehicles.

In recent years so-called Multiphase steels have been developed to meet the requirements of high strength and formability. Such steels, including Dual Phase (DP) steels (comprising ferrite and Martensite) and Transformation Induced Plasticity (TRIP) Steels (comprising Ferrite, Bainite and Retained Austenite) deliver high uniform and total elongations at high strengths.

Although, for many applications, tensile elongation may be considered a key indicator of formability, other parameters may be critical for some forming routes and performance in service. In particular, high stretched edge ductility (hole expansivity) may be of critical importance for widespread applications within the body in white and chassis and suspension. Conventional multiphase microstructures, such as those found in DP and TRIP steels, comprising mixtures of hard and soft phases whilst delivering high tensile elongation generally perform poorly in stretched edge ductility tests.

More recent effort has been devoted to developing new classes of steel for which stretched edge ductility is significantly improved. Such steels, including Nano Precipitated Ferritic Steels, Complex Phase Steels and So-called third Generation AHSS, are designed to find a better balance between tensile ductility and stretched edge ductility. Complex phase steels are the most commercially exploited of these variants both in cold rolled annealed and hot rolled conditions.

The microstructures of Complex Phase steels comprise Ferrite with Bainite and Martensite. Such structures exhibit much improved stretched edge ductility compared to DP steels albeit at the expense of some tensile ductility. However, in some scenarios exchange of tensile ductility for stretched edge ductility is warranted. Examples include roll formed parts where bendability rather than stretchability is required, parts formed from blanks in which holes have been pre-punched, parts for which the design leads to high edge deformation during press forming.

Complex phase steels also generally exhibit higher yield strengths prior to forming than do DP or TRIP steels. High yield ratios prior to forming may also be advantageous with respect to shape control in roll forming, achieving desired strength in formed parts which are subjected to limited deformation and achieving uniform strength throughout a formed component. High yield strength may also be beneficial in crash. High yield strength and greater uniformity of microstructure may also be beneficial in terms of fatigue performance which is of particular importance in chassis and suspension applications.

The complex nature of CP steels demands tight control of process. Three phases must be formed on the run-out-table or on the coil. Failure to achieve the required complex cooling patterns may lead to an unacceptable variation in mechanical properties from coil to coil and within a coil. Chemistries that are insensitive to process variations and that enable consistent properties coil to coil and within a coil are a key requirement for production of commercial CP steels.

SUMMARY OF THE INVENTION

The object of the invention is to provide a method for producing hot-rolled steel strip with a tensile strength of between 760 and 940 MPa.

Also an object is to produce a hot-rolled steel strip with a tensile strength of between 760 and 940 MPa.

Also an object is to produce a hot-rolled steel strip with a high yield strength and a uniform microstructure and good hole expansivity properties.

One or more of the objects of the invention is (are) reached by a process for producing hot-rolled steel strip with a tensile strength of between 760 and 940 MPa and a hole expansion ratio of at least 50%, the steel having a final microstructure comprising ferrite, bainite and at least 3% of martensite, wherein the total volume of the ferrite phase and the bainite phase is not smaller than 80%, optionally also tempered martensite, retained austenite and/or fine carbides having an average diameter of not larger than 30 nm, and wherein the microstructure does not contain pearlite and/or coarse $Fe_3C$ comprising, in weight %:
- 0.07 to 0.15% C;
- 0.65 to 1.30% Mn;
- 0.6 to 1.4% Cr;
- 0.005 to 0.8% Si;
- up to 0.06% P;
- up to 0.05% S;
- up to 0.001% B;
- 0.07 to 0.2% Ti;
- 0.003 to 0.6% Al;
- up to 0.01% N;
- Optionally calcium in an amount consistent with a calcium treatment for MnS inclusion control or REM in an amount consistent with a treatment for MnS inclusion control;
- remainder iron and inevitable impurities associated with the steelmaking process;

the process comprising:
- providing a steel slab or thick strip of said composition, optionally calcium treated, by:
  - continuous casting, or
  - by thin slab casting, or
  - by belt casting, or
  - by strip casting;
- optionally followed by reheating the steel slab or strip at a reheating temperature of at most 1300° C.;

hot rolling the slab or thick strip and finishing the hot-rolling process at a hot rolling finishing temperature above $Ar_3$ so that the steel is still austenitic during the last hot-rolling pass;

cooling the hot rolled strip by means of continuous cooling or interrupted cooling at a cooling rate of at least 20° C./s to a coiling temperature of between Ms and Bs.

Preferred embodiments are disclosed in the dependent claims.

DETAILED DESCRIPTION OF THE PREFERRED EMBODIMENTS

Figure 1:
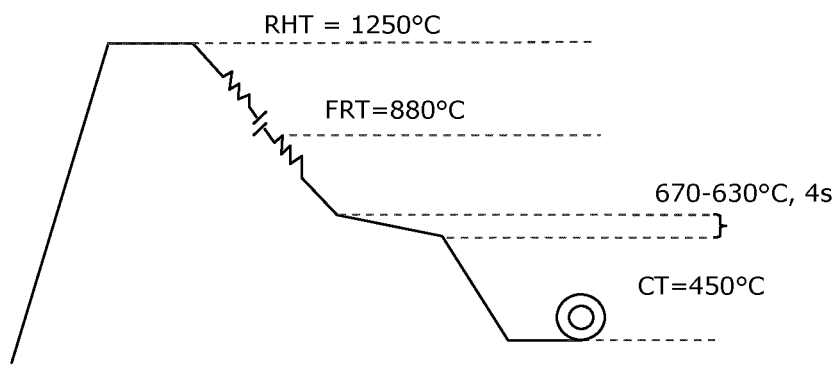
FIG. 1 shows process conditions of the examples.

The chemical components will now be described. Incidentally, the expression "%" used throughout in the following description in relation to chemical composition means weight percent (wt. %).

Carbon (C) provides hardenability and solid solution strengthening. C forms carbides containing Ti which are finely precipitated in the ferrite matrix to impart a high strength to the steel sheet. Also, C ensures sufficient hardenability to enable the formation of martensite. However, if the amount of C is less than 0.07%, the martensite is not formed. If the C amount exceeds 0.15%, then excessive formation of martensite at the expense of bainite is promoted and the stretch flangeability and spot weldability deteriorate. Carbon addition should be less than 0.15%, preferably less than 0.13% so as to ensure spot weldability.

Manganese (Mn) provides significant solid-solution strengthening, increases hardenability and suppresses the ferritic transformation temperature and ferritic transformation rate. Mn should preferably be no higher than 1 wt %, and preferably not be higher than 0.95%. Mn contents above this level lead to excessive retardation of the growth rates of ferrite and thus require the application of a cooling arrest in the ferritic transformation range in order to form sufficient ferrite. Mn also serves to suppress the cementite formation by promoting the C diffusion in the austenite phase and to contribute to the formation of the hardening phases. However, if the Mn content is lower than 0.65%, the effect of suppressing the cementite formation is not sufficient. Also, if the Mn content exceeds 1.30%, the segregation is rendered prominent to lower the workability of the steel. A suitable maximum value for Mn is 1.0%

Silicon (Si) provides significant solid solution strengthening and retards the formation of cementite and pearlite thus suppressing the formation of coarse carbides and enhancing hole expansitivity. In this respect, it is desirable for the steel to contain not less than 0.005% of Si, and preferably not less than 0.1%. Preferably Si should be greater than 0.4 wt % to prevent pearlite formation in industrial production. However, if Si is added in an amount exceeding 0.8%, the surface properties of the steel sheet are impaired and the plating property of the steel sheet is adversely affected. Moreover, friction during hot rolling can become a serious issue at high silicon levels. If plating properties and/or rolling forces are of a greater concern than the pearlite formation, a suitable maximum value for Si is 0.35%.

Phosphorus (P) is effective for promoting the solid solution strengthening but also causes the stretch flangeability of the steel to be reduced as a result of segregation to the grain boundaries. Furthermore, P may lead to embrittlement at hot working temperatures. For these reasons the amount of P should be as low as possible. The maximum tolerable phosphorus content is 0.06% or less and preferably it is 0.03% or less.

Sulphur (S) potentially forms a sulphide of Ti or Mn and, thus, causes the effective amount of Ti and Mn to be lowered. In addition MnS inclusions, especially if elongated during hot working, may lead to a significant reduction of hole expansitivity. Such being the situation, the S content should be as low as possible and be at most 0.05% or less, preferably at most 0.01% or even more preferably at most 0.005%.

Aluminium (Al) is added for the purpose of de-oxidation prior to casting. Excess Al may be added to complement the addition of Si since it has comparable effects on carbide formation. Al addition may be used to accelerate bainitic transformation. A suitable minimum value is 0.03%.

Titanium (Ti) provides precipitation strengthening and grain refinement. By forming fine composite carbides and, thus, is one of the important elements in the present invention. However, if the Ti content is lower than 0.07%, fine precipitates of composite carbides are not formed in a sufficiently large amount so as to make it difficult to obtain a high strength not lower than 760 MPa with a high stability. On the other hand, where Ti is added in an amount exceeding 0.20% the composite carbides formed are rendered coarse to lower the strength of the steel sheet. A suitable maximum value is 0.15%.

The amount of nitrogen (N), which is coupled with Ti to form a relatively coarse nitride thereby lowering the amount of the effective Ti and consequently lowering strength whilst leading to a reduction in hole expansitivity, should be as low as possible. Therefore the maximum nitrogen content is 0.01% (100 ppm) or less, preferably 0.005% or less.

Cr+Mn: Should fall in the range 1.2-2.5 to ensure sufficient hardenability to form a structure comprising ferrite, bainite and martensite under industrially relevant cooling conditions.

The invention as claimed utilises a balanced composition comprising medium carbon but lower Mn and higher Cr additions than found in current commercial CP steels. Partial substitution of Mn with Cr maintains sufficient hardenability to achieve the desired product but without excessively suppressing the ferritic transformation temperature and consequently retarding the growth of ferrite. Such balanced chemistries are shown to deliver microstructures and properties conforming to CP specifications under a wider range of cooling conditions than is possible for Mn-rich commercial chemistries. The ability to produce consistent properties with both continuous cooling and arrested cooling paths reveals that Cr-based chemistries are more robust to variation in process and dimensions and that they are thus better suited to deliver consistent product.

The invention as claimed offers a balance of formability requirements by introducing more ferrite into the CP microstructures but in such a way as to limit the local heterogeneities in strength which lead to strain localisation and damage intolerance. This can be done via a combination of grain refinement and precipitation strengthening with Ti. Additionally introduce a fraction of martensite in order the generate a composite effect which improves uniform and total elongation but do so in such a way as to ensure that martensite does not interface with ferrite and therefore does not introduce grain scale heterogeneities responsible for strain localisation and damage. This can be done by embedding the martensite within a third phase of bainite with strength which is intermediate between ferrite and martensite.

It is essential that the microstructure comprises ferrite, bainite and martensite. It may also comprise small fractions of tempered martensite, retained austenite and fine carbides. The microstructure may not comprise coarse $Fe_3C$ and pearlite as these components adversely affect the properties. Coarse carbides in the context of this microstructure do not include the carbides in the bainite because these are considered to be fine carbides or any carbides potentially formed in tempered or auto-tempered martensite.

Preferably the total volume of the ferrite phase and the bainite phase is not smaller than 80% and preferably not smaller than 90%. The volume of the martensite phase should be at least 3%, and preferably at least 5%.

The average carbide diameter of the fine carbides is preferably not larger than 30 nm. Where the average carbide diameter is not larger than 30 nm, the carbides contribute more effectively to the strengthening of the ferrite phase to improve the balance between the strength and the uniform elongation and to improve the stretch flangeability. On the other hand, where the average carbide diameter exceeds 30 nm, the uniform elongation and the stretch flangeability of the steel sheet are lowered. Such being the situation, the average particle diameter of the composite carbides is defined not to exceed 30 nm.

The manufacturing conditions employed in the present invention will now be described.

The steel sheet of the present invention can be manufactured by hot rolling a slab having the chemical compositions described above. All the steel making methods generally known to the art can be employed for manufacturing the steel sheet of the present invention and, thus, the steel making method need not be limited. For example, it is appropriate to use a converter or an electric furnace in the melting stage, followed by performing a secondary refining by using a vacuum degassing furnace. Concerning the casting method, it is desirable to employ a continuous casting method in view of the productivity and the product quality. This may be continuous casting of thick or thin slab, by belt casting or strip casting.

In the present invention, it is possible to employ the ordinary process comprising the steps of casting a molten steel, cooling once the cast steel to room temperature, and re-heating the steel so as to subject the steel to a hot rolling. It is also possible to employ a direct rolling process in which the steel immediately after the casting, or the steel further heated after the casting for imparting an additional heat, is hot rolled. In any of these cases, the effect of the present invention is not affected. Further, in the hot rolling, it is possible to perform the heating after the rough rolling and before the finish rolling, to perform a continuous hot rolling by joining a rolling material after the rough rolling stage, or to perform the heating and the continuous rolling of the rolling material. In any of these cases, the effect of the present invention is not impaired. The reheating temperature of the slab is at most 1300, preferably at most 1250° C. The temperature of finish rolling in the hot rolling process must be chosen such that the microstructure is still austenitic at the time of the last rolling pass in the hot-rolling process.

In the steel sheet of the present invention, the bainite transformation is utilized for promoting the generation of the retained austenite, and the bainite phase is utilized for improving the strength of the steel sheet. It is appropriate to set the coiling temperature after the hot rolling process to between the start of the bainite transformation (Bs) and the start of the martensite transformation (Ms). If the coiling temperature exceeds Bs, then cementite ($Fe_3C$) is precipitated during the cooling of the coiled strip and pearlite may form both of which are detrimental to formability. If the coiling temperature is lower than Ms, then the amount of martensite becomes much too large and this will deteriorate the stretched edge ductility. Bs and Ms are dependent on (among others) the chemical composition, generally speaking the coiling temperature will be between Bs−50° C. and $M_s$ or preferably Bs−80° C. and $M_s$+20° C. where the critical transformation temperatures Bs and Ms are determined either using standard dilatometric techniques or metallurgical models appropriate to the composition and processing conditions applied. In order to obtain abovementioned microstructure of the present invention, it is desirable for the steel sheet after the hot rolling stage to be cooled at an average cooling rate of at least 20° C./s. If the average cooling rate after the hot rolling step is lower than 20° C./s, the ferrite grains and the precipitation strengthened grains contained in the ferrite phase are enlarged and coarsened so as to lower the strength of the steel sheet. Therefore it is preferable that the average cooling rate is not lower than 30° C./s. If the average cooling rate after the hot rolling step is too high then it becomes impossible to generate the ferrite grains and the strengthening carbides. Therefore it is preferable that the average cooling rate is not higher than 150° C./s.

In an embodiment the cooling process includes the steps of cooling the hot rolled steel sheet to a temperature region falling within the range of 600 to 750° C., preferably of at least 630° C. and/or at most 670° C., at an average cooling rate not lower than 20° C./s, air-cooling the steel sheet within the temperature range of 600° C. to 750° C. (or at least 630° C. and/or at most 670° C.) for 1 to 25 seconds, further cooling the steel sheet to the coiling temperature at an average cooling rate not lower than 20° C./s and coiling the steel sheet at the aforementioned coiling temperature. This is the so-called stepped cooling or interrupted cooling on the run-out table. It should be noted that, if the average cooling rate after the hot rolling step is lower than 20° C./s, the ferrite grains and the composite carbide grains contained in the ferrite phase are enlarged and coarsened so as to lower the strength of the steel sheet. Further, if the air-cooling is performed for 1 to 25 seconds in the temperature range of 600° C. to 750° C. (or at least 630° C. and/or at most 670° C.), it is possible to promote the ferrite transformation, to promote the C-diffusion in the untransformed austenite, and to promote the fine precipitation of carbides in the formed ferrite. If the air-cooling temperature exceeds 750° C., the precipitates are rendered too large and coarse and the precipitate spacing becomes too large. On the other hand, if the air-cooling temperature is lower than 600° C., the carbide precipitation is adversely affected. If the air-cooling time is longer than 25 seconds, the ferrite transformation proceeds excessively, resulting in too low a bainite content. Also, if the average cooling rate after the air-cooling stage is lower than 20° C./s, pearlite may be formed and this is very undesirable. Preferably the air-cooling time is at most 15 second, more preferably at most 10 seconds.

The hot-rolled steel sheet produced this way can be plated by hot dipping or electroplating in a conventional way. The plating layer may be zinc-based but it is possible for the plating to include alloying elements such as e.g. Mg, Al and Cr in addition to zinc.

According to a second aspect a hot-rolled steel with a tensile strength of between 760 and 940 MPa and a hole expansion ratio of at least 50% is provided, the steel having a final microstructure comprising ferrite, bainite and at least 3% of martensite, wherein the total volume of the ferrite phase and the bainite phase is not smaller than 80%, optionally also tempered martensite, retained austenite and/or fine carbides having an average diameter of not larger than 30 nm, and wherein the microstructure does not contain pearlite and/or coarse $Fe_3C$, comprising, in weight %:

0.07 to 0.15% C
0.65 to 1.30% Mn
0.6 to 1.0% Cr
0.005 to 0.8% Si
up to 0.06% P
up to 0.05% S
up to 0.001% B
0.07 to 0.2% Ti
0.003 to 0.6% Al
up to 0.01% N

Optionally calcium in an amount consistent with a calcium treatment for MnS inclusion control or REM in an amount consistent with a treatment for MnS inclusion control remainder iron and inevitable impurities associated with the steelmaking process Preferred embodiment are provided in the dependent claims.

EXAMPLES

The invention is now explained by means of the following examples of which the chemical composition is given in table 1. The examples shown are for laboratory cast and ingots subjected to full hot rolling mill simulations.

Figure 2:
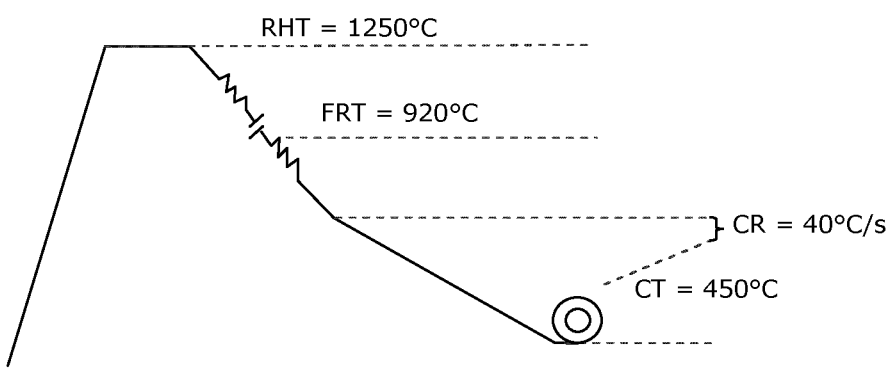
FIG. 2 shows process conditions of the examples.

Comparative example D delivers properties that fulfil the requirements when arrested cooling is applied (see FIGS. 1 and 2 for the process conditions). Combined addition of Si and Ti provides both grain refinement and suppression of coarse carbides. When arrested cooling is used the desired structure of ferrite with bainite and martensite can be obtained. However martensite fractions are very low. In contrast, continuous cooling of comparative example D leads to excessively high strength and low ductility due to retardation of the ferritic transformation by Mn and the consequent formation of very high fractions of martensite.

Steel H fulfils all tensile property requirements for both continuous and arrested cooling (see FIGS. 1 and 2 for the process conditions). The final microstructure comprises ferrite and bainite with a small fraction of martensite regardless of cooling pattern. The small but significant fraction of martensite is present but is predominantly embedded within the bainitic phase.

Tensile testing was conducted on JIS5 tensile test pieces, and hole expansion testing was made using a conical punch and punched holes.

TABLE 2

Tensile Data

| Alloy Code/Process | YS (MPa) | UTS (MPa) | YS/UTS | UE (%) | TE (%) | HEC (%) | Inv./Comp. |
|---|---|---|---|---|---|---|---|
| D CC, CT = 450° C. | 886 | 969 | 0.91 | 3.7 | 7.0 | 45 | Comp |
| D Arr. C, CT = 450° C. | 730 | 821 | 0.89 | 6.8 | 11.7 | 45 | Comp |
| H CC, CT = 450° C. | 668 | 805 | 0.83 | 5.6 | 11.9 | 58 | Inv. |
| H Arr C, CT = 450° C. | 723 | 810 | 0.89 | 9.7 | 15.8 | 58 | Inv. |
| J CC, CT = 490° C. | 715 | 813 | 0.88 | 8.8 | 16.1 | 65 | Inv. |
| J CC, CT = 510° C. | 695 | 802 | 0.87 | 8.9 | 16.1 | 55 | Inv. |
| J CC, CT = 500° C. | 703 | 804 | 0.87 | 8.7 | 16.2 | 62 | Inv. |
| J CC, CT = 460° C. | 715 | 810 | 0.89 | 8.5 | 17.0 | 71 | Inv. |
| J CC, CT = 440° C. | 750 | 835 | 0.90 | 5.7 | 11.2 | 91 | Inv. |

From this table it can be seen that H is much more suited to full scale production of a consistent product with stable properties across a commercial range of product dimensions. The choice of cooling pattern has a low impact on steel H, whereas for D the mechanical properties are widely differing. This scatter in properties is supported by measurements on industrially produced materials with a chemistry based on D. The hole expansion ratios of steels H and J are respectively 58% and 65%, which fulfils most existing specifications for CP steels. When producing the steel under industrial conditions, due to improvements in steel cleanliness compared with laboratory scale casts, these values are expected to increase significantly. By comparison, the commercially produced steel D has a hole expansion ratio of only 45% which is lower than is desirable for a CP product (i.e. below 50%).

Steel H delivers a better combination of ductility and hole expansivity than Steel D. Of particular significance is a comparison of uniform elongation since this reveals that the

TABLE 1 composition in 1/1000 wt. % except N and B in ppm

| ID | C | Mn | P | S | Si | Al | N | Cr | B | Ca | Ti | Mo, Ni, Cu, Co, V, Nb, Zr, W |
|---|---|---|---|---|---|---|---|---|---|---|---|---|
| D | 100 | 1700 | 2 | 1 | 490 | 8 | 11 | 300 | 5 | 5 | 96 | Impurity level |
| H | 100 | 930 | 2 | 1 | 490 | 8 | 11 | 790 | 5 | 5 | 96 | Impurity level |
| J | 104 | 916 | 5 | 2 | 250 | 20 | 25 | 1010 | 3 | 5 | 111 | Impurity level | uniform elongation is consistently better for steel H. High uniform elongation combined with good hole expansitivity can be taken as an indication that both edge ductility and stretchability have been improved with respect to steel D.

Figure 3:
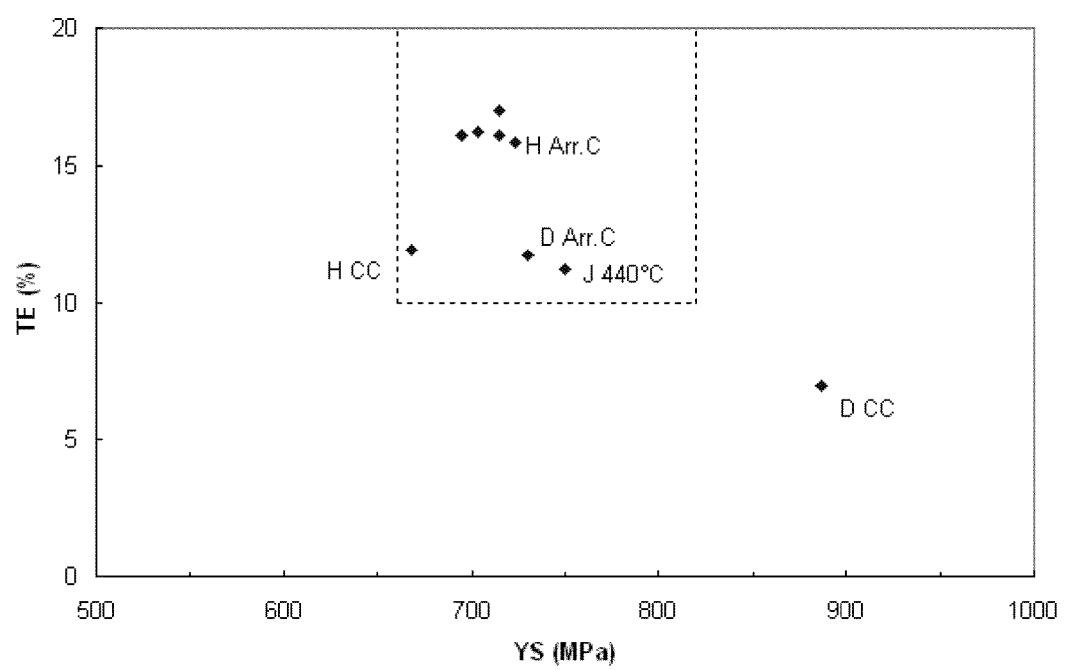
FIG. 3 shows the values of the uniform elongation against the yield strength of the final product of the examples.

FIG. 3 shows the values of the uniform elongation against the yield strength of the final product.

Figure 4:
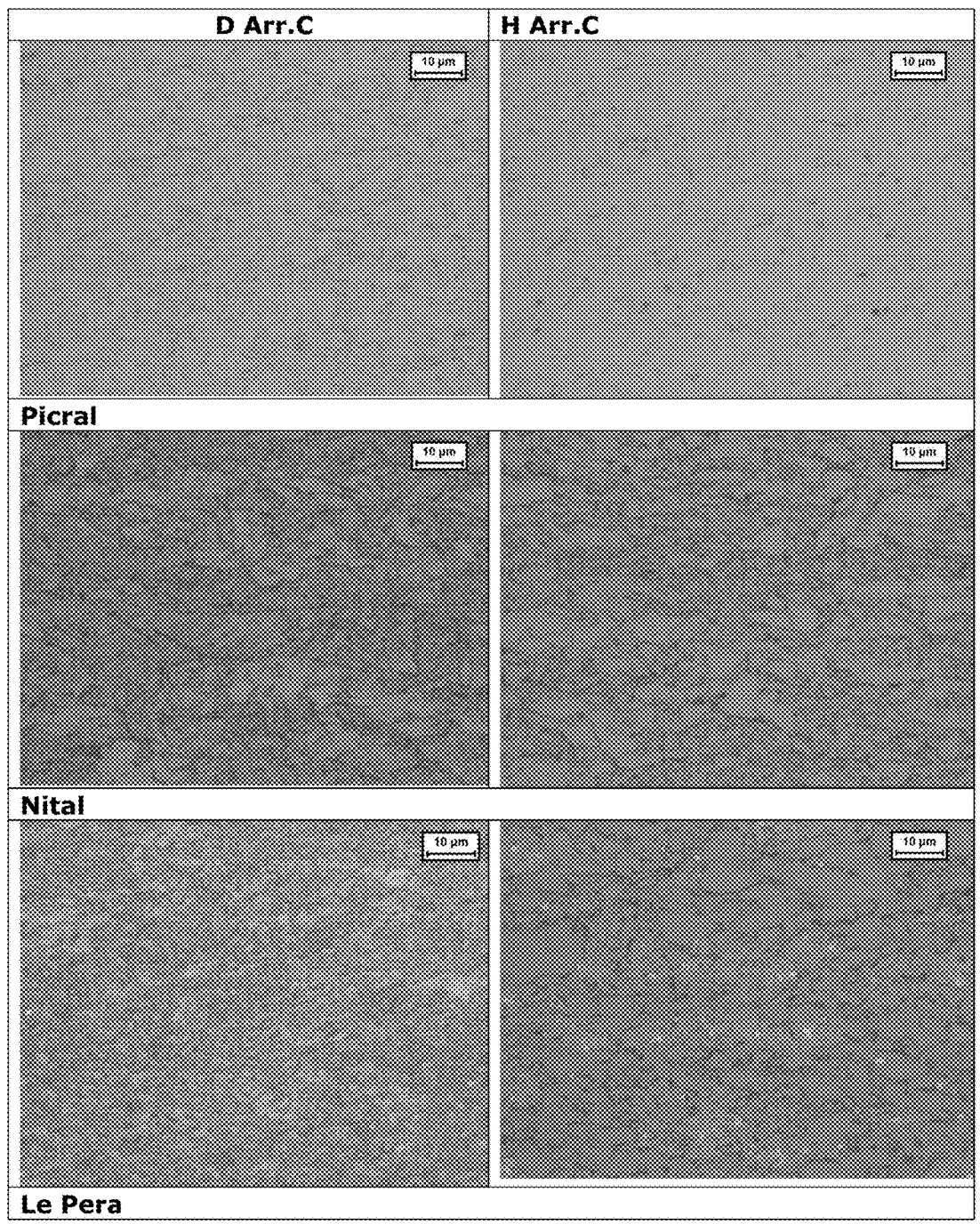
FIG. 4 shows micrographs of the examples.

This improvement is due to optimisation of the microstructure. The micrographs in FIG. 4 provide supporting evidence. FIG. 4 reveals that the microstructure of steel D, even when subjected to arrested cooling, comprises very little polygonal ferrite, is predominantly bainite and that there is very little, if any, martensite. Steel H on the other hand comprises a significant fraction of polygonal ferrite with a significant fraction of bainite and a small but significant fraction of martensite. Martensite, where present, is embedded within the bainitic phase.

It is argued that the high ductility observed is mainly due to the presence of ductile ferrite. Bainite provides strength without presenting hard interfaces with the ferrite which would otherwise cause strain localisation and damage. The presence of hard martensite provides strength. The presence of martensite does not lead to a deterioration of hole expansivity as commonly observed in DP steels due to the fact that, since it is distributed within bainite, it does not share interfaces with soft ferrite and so does not cause strain localisation and damage. The presence of martensite may also explain the comparatively high uniform elongation since it imparts some DP character.

It is argued here that the improved consistency in mechanical properties is due to better tuning of the ferritic transformation by partial replacement of Mn with Cr such that ferrite will form for a wide variation of cooling conditions. CCT diagrams reveal that H exhibits much lower critical cooling rates for the ferrite transformation such that ferrite transformation will occur during continuous cooling for all relevant austenitisation conditions and cooling rates. Conversely, for D ferrite may or may not form depending on the prior austenite condition.

The present invention provides a high strength hot rolled steel sheet used in various fields including, for example, the use as a steel sheet for an automobile.

The invention claimed is:

1. A process for producing a hot-rolled steel strip with a tensile strength of between 760 and 940 MPa and a hole expansion ratio of at least 50%, the steel having a final microstructure comprising ferrite, bainite and at least 3% of martensite, wherein the total volume of a ferrite phase and a bainite phase is not smaller than 80%, optionally also tempered martensite, retained austenite and/or fine carbides having an average diameter of not larger than 30 nm, and wherein the final microstructure does not contain pearlite and/or coarse $Fe_3C$ and has a steel composition comprising, in weight %:
0.07 to 0.13% C,
0.75 to 1.30% Mn,
0.6 to 1.4% Cr,
0.1 to 0.49% Si,
0.03% P or less,
up to 0.05% S,
up to 0.001% B,
0.07 to 0.15% Ti,
0.003 to 0.6% Al,
up to 0.01% N,
optionally calcium in an amount consistent with a calcium treatment for MnS inclusion control or REM in an amount consistent with a treatment for MnS inclusion control, and remainder iron and inevitable impurities associated with the steelmaking process;
the process comprising:
providing a steel slab or thick strip of the steel composition, optionally calcium treated, by:
continuous casting,
thin slab casting,
belt casting, or
strip casting;
optionally followed by reheating the steel slab or thick strip at a reheating temperature of at most 1300° C.;
hot-rolling the steel slab or thick strip at a hot-rolling finishing temperature above $Ar_3$ so the steel composition is still austenitic during a last hot-rolling pass;
cooling the hot-rolled steel strip by means of continuous cooling or interrupted cooling at a cooling rate of at least 20° C./s to a coiling temperature between Ms and Bs which is between 440° C. and 600° C.; and
coiling the hot-rolled steel strip at said coiling temperature.

2. The process for producing a hot-rolled steel strip according to claim 1, wherein the steel composition comprises at least 0.03% aluminum.

3. The process for producing a hot-rolled steel strip according to claim 1, wherein the steel composition comprises at most 1.0% manganese.

4. The process for producing a hot-rolled steel strip according to claim 1, wherein cooling the hot-rolled steel strip by means of continuous cooling or interrupted cooling is at a cooling rate of at least 30° C./s.

5. The process for producing a hot-rolled steel strip according to claim 1, wherein cooling the hot-rolled steel strip by means of continuous cooling or interrupted cooling is at a cooling rate of at most 150° C./s.

6. The process for producing a hot-rolled steel strip according to claim 1, wherein the steel composition comprises 0.005 to 0.35% Si by weight.

7. The process for producing a hot-rolled steel strip according to claim 1, wherein cooling the hot-rolled steel strip takes place by means of interrupted cooling.

8. The process for producing a hot-rolled steel strip according to claim 1, wherein the martensite is embedded within the bainite phase.

9. The process for producing a hot-rolled steel strip according to claim 1, wherein the steel composition comprises at most 0.002% P by weight.

10. The process for producing a hot-rolled steel strip according to claim 1, wherein the steel composition comprises at most 1.0% Cr by weight.

11. The process for producing a hot-rolled steel strip according to claim 1, wherein the steel composition comprises:
0.07 to 0.104% C,
0.75 to 1% Mn,
0.79 to 1.01% Cr,
0.1 to 0.49% Si,
0.03% P or less,
up to 0.05% S,
up to 0.001% B,
0.08 to 0.15% Ti,
0.003 to 0.6% Al,
up to 0.01% N,
optionally calcium in an amount consistent with a calcium treatment for MnS inclusion control or REM in an amount consistent with a treatment for MnS inclusion control, and remainder iron and inevitable impurities associated with the steelmaking process;

wherein said cooling the hot-rolled steel strip is by means of continuous cooling at the cooling rate of at least 20° C./s to the coiling temperature between Ms and Bs which is between 440° C. and 600° C.

12. The process for producing a hot-rolled steel strip according to claim 1, wherein said cooling the hot-rolled steel strip is by means of continuous cooling at the cooling rate of at least 20° C./s to the coiling temperature between Ms and Bs which is between 440° C. and 600° C.

13. The process for producing a hot-rolled steel strip according to claim 1, wherein the steel composition comprises 0.003 to 0.03% Al by weight.

14. The process for producing a hot-rolled steel strip according to claim 11, wherein the steel composition comprises 0.003 to 0.03% Al by weight.

* * * * *